Sept. 15, 1970     D. L. PAINE     3,528,300
ATTITUDE GYROSCOPE
Filed Feb. 23, 1968     2 Sheets-Sheet 1
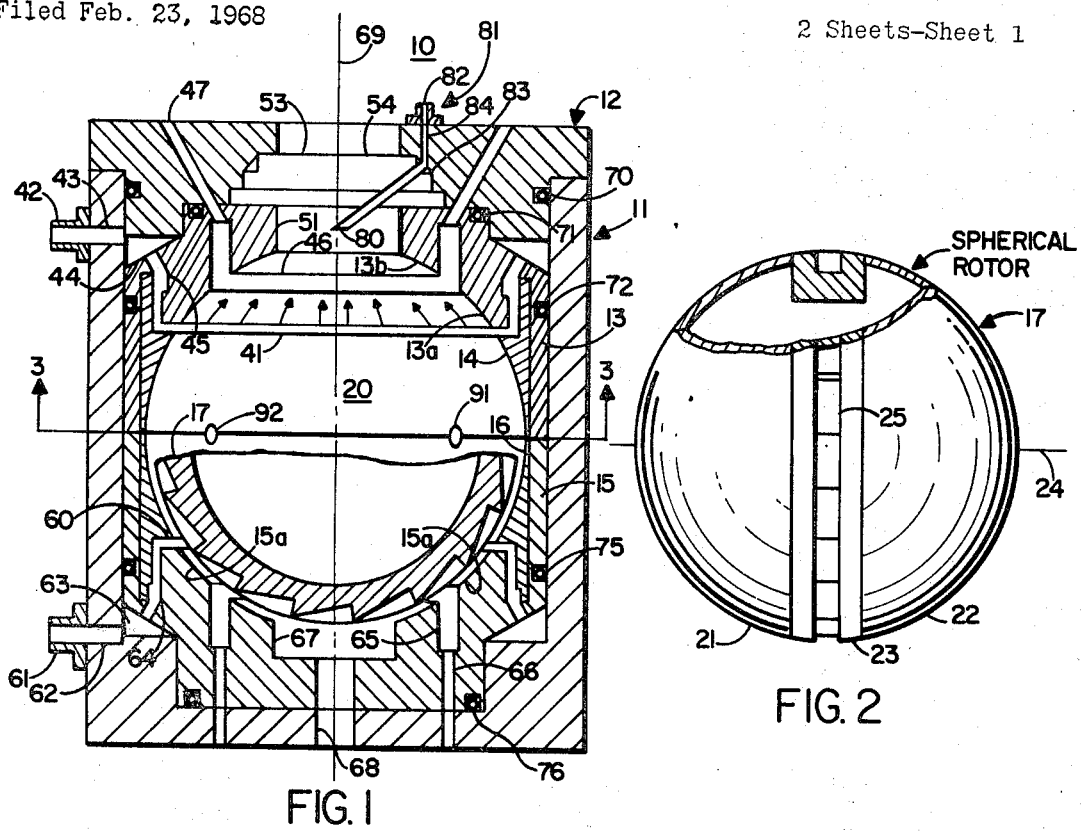
FIG. 1
FIG. 2
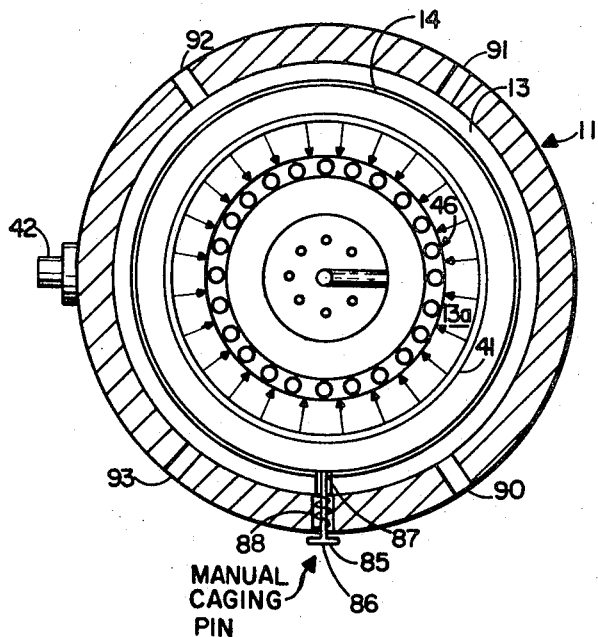
FIG. 3
INVENTOR.
DAVID L. PAINE
BY *Carl L. Johnson*
ATTORNEY United States Patent Office 3,528,300
Patented Sept. 15, 1970

3,528,300
ATTITUDE GYROSCOPE
David L. Paine, Minneapolis, Minn., assignor to Honeywell Inc., Minneapolis, Minn., a corporation of Delaware
Filed Feb. 23, 1968, Ser. No. 707,755
Int. Cl. G01c *19/12, 19/26*
U.S. Cl. 74—5.7        8 Claims

ABSTRACT OF THE DISCLOSURE

A single-axis attitude gyroscope having a spherical rotor with impeller buckets located on a great circle thereof. The rotor is hydrostatically supported and driven by two annular, arcuate bearing pads.

---

The invention herein described was made in the course of or under a contract, or subcontract thereunder, with the Department of the Air Force.

BACKGROUND OF THE INVENTION

This invention relates generally to gyroscopes and, more specifically, to a single-axis attitude gyroscope.

Aircraft control systems require an accurate indication of the aircraft heading. A single-axis attitude gyroscope can provide this heading information. The present invention provides a low-cost, single-axis attitude gyroscope having a very low precession rate. The low precession rate makes it suitable for use as an accurate aircraft heading indicator. Because the attitude gyroscope produces a fluidic output signal, it is especially adapted for low-cost fluidic aircraft control systems.

SUMMARY OF THE INVENTION

The applicant's single-axis attitude gyroscope comprises a spherical rotor having impeller buckets for spinning the rotor. The impeller buckets are located around a great circle of the rotor. Two annular arcuate bearing pads supply fluid to hydrostatically support and spin the rotor at a substantially constant angular velocity about a preferred spin axis. Viscous torquing between the housing and the rotor keeps the rotor spin axis in a plane perpendicular to a second axis which is fixed relative to the housing. Rotating the housing about the second axis produces a pressure signal indicative of the rotation.

BRIEF DESCRIPTION OF THE DRAWING

FIG. 1 is a vertical cross-sectional view of the attitude gyroscope;
FIG. 2 shows the spherical rotor partially cut away;
FIG. 3 is a cross-sectional view taken along line 3—3 of FIG. 1.

DESCRIPTION OF THE PREFERRED EMBODIMENT

Figure 4:
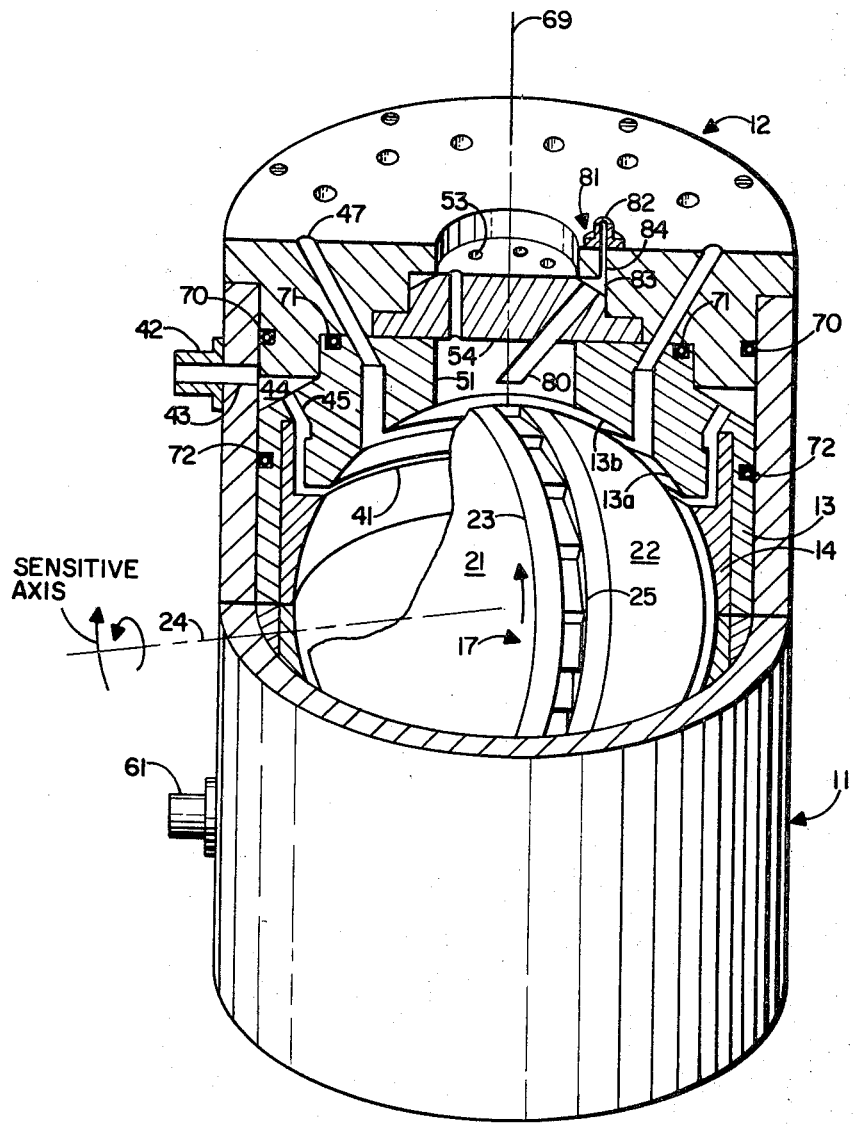
FIG. 4 is a pictorial representation of the attitude gyroscope partially in vertical section.

FIG. 1 shows an attitude gyroscope 10 in vertical section. The gyroscope 10 comprises a cylindrical housing 11, a top plate 12, an upper bearing pad 13, an upper bearing insert 14, a lower bearing pad 15, a lower bearing insert 16, and a spherical rotor 17 (partially cut away). The spherical rotor 17 rotates in a spherical cavity 20 formed by upper bearing pad 13, upper bearing insert 14, lower bearing pad 15, and lower bearing insert 16.

The spherical rotor 17 (FIG. 1, FIG. 2 and FIG. 4) includes a first thin-shelled substantially hemispherical portion 21, a second thin-shelled substantially hemispherical portion 22, and a massive, thick-shelled, annular drive assembly 23 located on a great circle between the two hemispherical portions. Because of the massive annular drive assembly 23, the rotor has a preferred spin axis 24.

The preferred spin axis 24 is pependicular to a plane passing though the great circle of the drive assembly. Located around drive assembly 23 are a plurality of impeller buckets 25. These buckets, because of their shape, provide a high resistance to fluid flowing counterclockwise past the drive assembly, as seen in FIG. 1, and provide a low resistance to fluid flowing clockwise past the drive assembly.

A first annular, arcuate bearing surface 13a hydrostatically supports the top of rotor 17. A second annular, arcuate bearing surface 15a hydrostatically supports the bottom of rotor 17. Because the annular, arcuate bearing surfaces 13a and 15a are positioned in an opposed relationship, only two are necessary to hydrostatically suspend the rotor within spherical cavity 20.

Annular bearing surface 13a receives fluid through an annular inlet 41 formed by bearing 13 and bearing insert 14. A high pressure fluid source (not shown) supplies fluid to annular inlet 41 through an inlet 42, a passage 43, an annular plenum chamber 44, and holes 45 located around annular plenum chamber 44. Fluid flows from annular inlet 41 into the region between bearing surface 13a and rotor 17 (cut away in FIG. 1) and exhausts through a low flow resistance annular outlet 46 connected to holes 47 spaced around annular outlet 46. The fluid flowing between bearing surface 13a and rotor 17 produces a hydrostatic support for rotor 17. FIG. 3 more clearly shows annular inlet 41 and annular outlet 46.

Rotor 17 and a second annular, arcuate surface 13b provide a region of high flow resistance causing the fluid around the rotor and in the impeller buckets to exhaust through low flow-resistance annular outlet 46. A circular passage 51 located at the top polar region of cavity 20 allows any fluid that passes the high flow-resistance region to exhaust through holes 53 located in an end piece 54. Because of the high flow-resistance very little fluid flows into this polar region. Thus, the polar region area of the spherical cavity remains at a relatively constant pressure which, as has been found, minimizes precession forces on the rotor.

Similarly, annular, arcuate bearing surface 15a receives fluid through an annular inlet 60 formed by lower bearing 15 and lower bearing insert 16. A high pressure fluid source (not shown) supplies fluid to annular inlet 60 through an inlet 61, a passage 62, an annular plenum chamber 63, and holes 64 spaced around the annular plenum chamber 63. Fluid flows from annular inlet 60 into the region between the bearing surface 15a and the spherical rotor 17. Fluid exhausts through a low flow-resistance annular outlet 65 which vents through holes 66 around an annular outlet 65. The fluid flowing between bearing surface 15a and rotor 17 produces a hydrostatic support for rotor 17. Lower bearing 15 and bearing insert 16, are identical to upper bearing 13 and bearing insert 14 previously described and will not be described further. Also a circular passage 67 located at the bottom polar region of cavity 20 allows any fluid that passes the high flow-resistance region to exhaust through a hole 68.

An axis 69 passes through the center of circular passage 51 and circular passage 67. It has been found that the viscous torquing between the rotor and the housing provides a force which causes rotor spin axis 24 to remain perpendicular to axis 69.

An O-ring 70 located between housing 11 and cap 12, an O-ring 71 located between cap 12 and bearing 13, and an O-ring 72 located between housing 11 and bearing 13 prevent leakage from the plenum chamber 44. A press fit between bearing 13 and bearing insert 14 prevents leakage therebetween. The fabrication of the bearing and the bearing insert in two pieces simplifies building the annular inlet because a space can be left between the bearing and the bearing insert for the annular inlet.

Similarly, an O-ring 75 located between housing 11 and bearing 15, and an O-ring 76 located between housing 11 and bearing 15 prevent leakage from the plenum chamber 63. Also bearing insert 16 is press fit into bearing 15, eliminating the necessity for O-ring seals between the two.

Located in end piece 54 is a pneumatic caging means 81. Caging means 81 comprises a fluid nozzle 80 directed tangentially along the spherical rotor but spaced apart therefrom. Nozzle 80 is connected to an inlet 82 through an annular plenum chamber 83 and passage 84. The plenum chamber 83 allows the end piece and nozzle 80 to be rotated to the proper orientation without moving the inlet 82. As a fluid stream issues from nozzle 80 it impinges on rotor 17 creating a torquing force on the rotor 17. This torquing force precesses rotor 17 until nozzle 80 is in alignment with impeller buckets 25.

A mechanical caging mechanism including a caging pin 85 (FIG. 3) passes through the cylindrical housing 11. Caging pin 85 has a flat-head 86 on one end and a point 87 on the other end. A spring 88 prevents the point 87 from contacting the rotor when in the normal uncaged position. The rotor can be caged by pressing the flat-head inward compressing spring 88 thus allowing the point 87 to contact the rotor 17. Because the rotor 17 has a preferred spin axis the rotor precesses until the spin axis (point of zero velocity) aligns with the caging pin. Releasing the flat-head pin allows the pointed end 87 to retract, thereby allowing the rotor to run freely. Either the pneumatic caging means or the manual caging pin 85 can be used to align the spin axis of the rotor with the housing. The manual caging pin offers an advantage because it can quite rapidly align the spin axis of the rotor to the desired orientation. However, the manual caging pin cannot be used if the buckets are rotating in alignment with end 87 of caging pin 85 because the point would be damaged by the rotating impeller buckets 25. The pneumatic caging means is slower and requires a longer interval before the spin axis is properly aligned. However, the pneumatic caging means can be used with any orientation of the rotor spin axis because there is no danger of damaging the nozzle 80 which never contacts rotor 17.

FIG. 3 shows four pressure pickoffs 90, 91, 92, and 93; however, only two are necessary to obtain a single axis attitude output signal. The fluid flowing from the inlets produces a pressure gradient along the inside of the housing. The pressure is highest at points perpendicular to the spin axis of the rotor and lowest at points perpendicular to the impeller buckets of the rotor. By measuring the pressure at two points, a differential pressure signal indicative of the velocity at those points on rotor 17 can be obtained. If housing 11 rotates, the pressure ports indicate pressure at two different positions on rotor 17. Because the velocity is different at these points, an indication of the spin axis displacement or single axis attitude information can be obtained. The assignee's Pat. 3,340,740 shows and more fully describes a pickoff for obtaining an output signal indicative of the displacement of the spin axis.

In operation, a high pressure source of fluid (not shown) supplies fluid to the two bearing pads 13 and 15 through annular inlets 41 and 60 respectively. Because the paths of the fluid from the fluid source to the bearing surfaces 13a and 15a are identical, the fluid path is explained only wiht reference to bearing surface 15a. Fluid flows from the inlet 61 through passage 62 into annular plenum chamber 63, through holes 64 and into annular inlet 60. The fluid flows along annular, arcuate bearing surface 15a and exhausts through the low flow-resistance annular outlet 65. As the fluid flows from annular inlet 60 to annular outlet 65, it hydrostatically supports spherical rotor 17. A portion of the fluid that flows through annular inlet 60 impinges in a clockwise direction on the impeller buckets 25; a portion of the fluid also impinges on the impeller buckets 25 in a counterclockwise direction. The portion of the fluid impinging on the impeller buckets in a clockwise direction passes smoothly past the buckets because the streamline bucket shape offers low resistance. However, the fluid impinging on the impeller buckets in the counterclockwise direction does not flow smoothly past the buckets because the bucket shape entraps fluid in pockets and thus offers a high resistance to the portion of the fluid flowing past the impeller buckets. Because of the higher resistance to fluid flowing in a counterclockwise than in a clockwise direction the fluid exerts a net counterclockwise force on impeller buckets 25. This force causes rotor 17 to spin counterclockwise at a constant angular velocity.

The momentum of the spinning rotor causes the spin axis to maintain a constant orientation in the absence of any external forces. Because of the relatively frictionless hydrostatic bearing on the top and bottom, rotating the housing about axis 69 does not affect the orientation of the spin axis. Also because of the annular inlet, rotating the housing does not affect the direction of the fluid flowing from the annular inlets 41 and 60 because a portion always flows clockwise around the buckets and a portion always flows counterclockwise around the buckets no matter how much the housing rotates about axis 69. Consequently, the rotor spins at a constant angular velocity because the forces are always the same on the impeller buckets.

To understand the operation of the invention more fully, assume that rotor 17 spins at a constant angular velocity about spin axis 24. Further, assume spin axis 24 is perpendicular to axis 69 (caged position). In this position impeller buckets 25 receive fluid from annular inlet 41 and annular inlet 60. Also the impeller buckets rotate through the polar region defined by circular passage 51 and circular passage 67. Now assume that housing 11 tilts in a plane defined by spin axis 24 and axis 69. Because of the low friction hydrostatic bearing and the angular momentum of spinning rotor 17 the rotor spin axis tends to remain fixed with respect to space. However, it has been found, that the viscous torquing on the rotor maintains spin axis 24 of the rotor perpendicular to axis 69. Obviously, if rotor 17 tilts with housing 11 the invention is insensitive to tilting of the housing.

To illustrate the operation of the invention about the sensitive axis, assume that housing 11 rotates about axis 69. Because of the low friction hydrostatic bearing and the angular momentum, spinning rotor 17, hence spin axis 24, maintains a fixed orientation with respect to space. Also because passages 51 and 67 are circular, rotor 17 does not "pneumatically lock" in a fixed position with respect to rotation of housing 11 about axis 69. Consequently, rotation about axis 69 produces regions of different peripheral velocity, hence different pressure, at pressure ports 90, 91, 92, and 93. This pressure signal is an indication of the rotation about axis 69.

Although the invention has been described and illustrated in detail, it is to be clearly understood that the same is by way of illustration and example only, and is not to be taken by way of limitation, the scope of this invention being limited only by the terms of the appended claims.

I claim:
1. Apparatus of the class described comprising:
   a housing defining a generally spherical chamber having a diametral axis fixed with respect to said housing, the intersections of the axis with the surface of the chamber defining poles thereof;
   a generally spherical rotor enclosed within the chamber, said rotor having a plurality of impeller buckets located on a great circle thereof, the impeller buckets configured to offer high resistance to fluid flow around the rotor at the great circle in one direction and to offer low resistance to flow in the opposite direction, said rotor having a spin axis perpendicular to the the great circle and passing through the center thereof;

annular fluid inlet means communicating with the chamber in said housing remote from the poles of the chamber;

annular fluid outlet means communicating with the chamber at locations between the poles thereof and said annular fluid inlet means, said annular fluid inlet means and said annular outlet means being centered on and lying in planes perpendicular to said diametral axis, said annular fluid inlet means and said annular fluid outlet means for causing fluid to flow meridionally toward the poles of the chamber between the chamber surface and the rotor surface, fluid flowing toward the poles acting to support said rotor, fluid flowing toward the poles further operable to spin said rotor for any orientation of the spin axis perpendicular to the diametral axis; and pickoff means for providing an output signal indicative of the orientation of said rotor with respect to said housing.

2. The apparatus of claim 1 further including caging means for orienting said rotor with respect to said housing.

3. The apparatus of claim 2 wherein said caging means includes a nozzle in said housing operable to direct a fluid jet obliquely against the surface of said rotor, thereby causing said rotor to assume an orientation in which the great circle of said rotor and a fluid jet from said nozzle lie in a common plane.

4. The apparatus of claim 2 wherein said caging means includes a pin slidably mounted in said housing perpendicular to the surface of said rotor, said pin being extendible into the chamber against said rotor, thereby causing said rotor to assume an orientation in which the spin axis thereof is aligned with said pin.

5. In a fluid powered gyroscope having a continuously driven rotor, said gyroscope comprising a housing in which is formed a generally spherical chamber having a diametral axis defining first and second poles at its points of intersection with the chamber surface, and a generally spherical rotor having a plurality of impeller buckets on a great circle thereof adapted for rotation in the chamber, the improvement which comprises:

annular fluid inlet means communicating with the chamber in the housing remote from the poles of the chamber; and annular fluid outlet means communicating with the chamber at locations between the poles thereof and said annular fluid inlet means, said annular fluid inlet means and said annular fluid outlets means being centered on and lying in planes perpendicular to said diametral axis, said annular fluid inlet means and said annular fluid outlet means for causing fluid to flow meridionally toward the poles of the chamber, between the chamber surface and the rotor surface, fluid flowing toward the poles acting to support said rotor, fluid flowing toward the poles further operable to spin said rotor about any spin axis perpendicular to the diametral axis of the chamber.

6. The gyroscope of claim 5 wherein said annular inlet means comprises first and second parallel annular fluid inlets and said fluid outlet means comprises first and second parallel annular fluid outlets located respectively between said first fluid inlet and the first pole and said second fluid inlet and the second pole.

7. The gyroscope of claim 5 further including fluid caging means for orienting said rotor with respect to said housing, said fluid caging means comprising a nozzle in said housing for directing a fluid jet obliquely against the surface of said rotor, thereby causing said rotor to assume an orientation in which the great circle thereof and the fluid jet from said nozzle lie in a common plane.

8. The apparatus of claim 5 further including mechanical caging means for manually orienting said rotor with respect to said housing, said manual caging means comprising a pin slidably mounted in said housing perpendicular to the surface of said rotor, said pin being manually extendible into the chamber against said rotor thereby causing said rotor to assume an orientation in which the spin axis thereof is aligned with said pin.

References Cited
UNITED STATES PATENTS

| | | | |
|---|---|---|---|
| 2,801,543 | 8/1957 | Toholsky | 74—5.7 |
| 2,997,886 | 8/1961 | Jones | 74—5.7 |
| 3,129,594 | 4/1964 | Hosli | 74—5.12 |
| 3,187,588 | 6/1965 | Parker | 74—5.7 XR |
| 3,257,854 | 6/1966 | Schneider et al. | 74—5.7 |
| 3,276,270 | 10/1966 | Speen | 74—5.6 |

MANUEL A. ANTONAKAS, Primary Examiner

U.S. Cl. X.R.

308—9; 74—5.1